United States Patent
Robertson et al.

(10) Patent No.: US 9,697,163 B2
(45) Date of Patent: Jul. 4, 2017

(54) DATA PATH CONFIGURATION COMPONENT, SIGNAL PROCESSING DEVICE AND METHOD THEREFOR

(75) Inventors: Alistair Robertson, Glasgow (GB); Manfred Thanner, Neubiberg (DE)

(73) Assignee: NXP USA, Inc., Austin, TX (US)

( * ) Notice: Subject to any disclaimer, the term of this patent is extended or adjusted under 35 U.S.C. 154(b) by 233 days.

(21) Appl. No.: 14/409,314

(22) PCT Filed: Jul. 3, 2012

(86) PCT No.: PCT/IB2012/053386
§ 371 (c)(1),
(2), (4) Date: Dec. 18, 2014

(87) PCT Pub. No.: WO2014/006451
PCT Pub. Date: Jan. 9, 2014

(65) Prior Publication Data
US 2015/0169494 A1 Jun. 18, 2015

(51) Int. Cl.
| | | |
|---|---|---|
| *G06F 13/00* | (2006.01) | |
| *G02B 6/12* | (2006.01) | |
| *G06F 13/42* | (2006.01) | |
| *G06F 1/32* | (2006.01) | |
| *G06F 9/445* | (2006.01) | |
| *G06F 13/40* | (2006.01) | |

(52) U.S. Cl.
CPC ........ *G06F 13/4221* (2013.01); *G06F 1/3203* (2013.01); *G06F 1/3243* (2013.01); *G06F 9/44505* (2013.01); *G06F 13/4022* (2013.01); *Y02B 60/1239* (2013.01)

(58) Field of Classification Search
CPC ............................ G06F 1/3287; G06F 1/3275
See application file for complete search history.

(56) References Cited

U.S. PATENT DOCUMENTS

| | | |
|---|---|---|
| 4,075,692 A | 2/1978 | Sorensen et al. |
| 6,038,624 A | 3/2000 | Chan et al. |
| 6,799,227 B2 | 9/2004 | Sathe |
| 7,962,770 B2 | 6/2011 | Capps, Jr. et al. |
| 2007/0110360 A1* | 5/2007 | Stanford ................ H04L 12/10 385/14 |
| 2007/0211648 A1 | 9/2007 | Megarity et al. |
| 2008/0320278 A1 | 12/2008 | Liang et al. |
| 2009/0327780 A1* | 12/2009 | Dawkins ............... G06F 1/3221 713/323 |
| 2010/0287443 A1 | 11/2010 | Rohleder et al. |
| 2011/0161535 A1 | 6/2011 | Ramchandran |
| 2013/0318371 A1* | 11/2013 | Hormuth .................. G06F 1/28 713/320 |

(Continued)

OTHER PUBLICATIONS

International Search Report and Written Opinion correlating to PCT/IB2012/053386 dated Mar. 27, 2013.

*Primary Examiner* — Hyun Nam (57) ABSTRACT

A data path configuration component for configuring at least one data path setting within a signal processing device is described. The data path configuration component is arranged to receive an indication of an operating mode of the signal processing device, and dynamically configure the at least one data path setting within the signal processing device based at least partially on the received indication of an operating mode of the signal processing device.

17 Claims, 5 Drawing Sheets

(56) References Cited

U.S. PATENT DOCUMENTS

2014/0179305 A1* 6/2014 Singh .................... H04W 4/005
　　　　　　　　　　　　　　　　　　　　　　455/426.1
2014/0247253 A1* 9/2014 Cho ....................... G09G 5/003
　　　　　　　　　　　　　　　　　　　　　　345/204

* cited by examiner

DATA PATH CONFIGURATION COMPONENT, SIGNAL PROCESSING DEVICE AND METHOD THEREFOR

FIELD OF THE INVENTION

The field of this invention relates to a data path configuration component and a method of configuring at least one data path setting within a signal processing device.

BACKGROUND OF THE INVENTION

In the field of signal processing devices, such as microcontrollers, and in particular in relation to such devices targeted at low power applications, it is known for such devices to support multiple power modes. Within each power mode, different features of the device may be operational, for example, some features may be clock-gated or power-gated depending on the particular power mode. Irrespective of the power mode in operation, a user wants to receive the best performance available. In particular, achieving the best performance with the lowest clock frequency is a key objective; if the device has to be clocked for longer or faster to accommodate poor performance, then this directly impacts the total power consumption, which in low power applications is unacceptable.

The optimal device configuration from a performance perspective in one power mode is not necessarily the optimal configuration in another power mode. In particular, the optimization of data paths between, for example, central processing unit (CPU) cores and memory elements, requires an in-depth understanding of the underlying system to correctly configure, and which can be significantly affected by changes in power mode.

Microcontroller devices and the like typically comprise various configurable elements that control the data paths between CPU cores and memory elements, such as a system crossbar, flash memory controller with associated pre-fetch buffering schemes, etc. Typically, such elements are configured by customers based on the individual requirements etc. of their particular applications.

However, due to difficulty for customers to gain an in-depth understanding of the underlying system and the complexities involved in re-configuring such elements within a typical microcontroller device, such devices are often configured in a non-optimized manner for one or more power modes.

SUMMARY OF THE INVENTION

The present invention provides a data path configuration component for configuring at least one data path setting within a signal processing device, a signal processing device comprising such a data path configuration component, and a method of configuring at least one data path setting within a signal processing device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to a microcontroller device implemented within a single integrated circuit (IC) device. However, it will be appreciated that the present invention may equally be implemented within other types of signal processing devices. For example, whilst microcontroller devices are typically intended for use within embedded applications and the like, it is contemplated that examples of the present invention may be implemented within signal processing devices intended for more general purpose use, such as microprocessor devices and system-on-chip (SoC) devices, or within signal processing devices intended for performance critical roles such as digital signal processor (DSP) devices.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
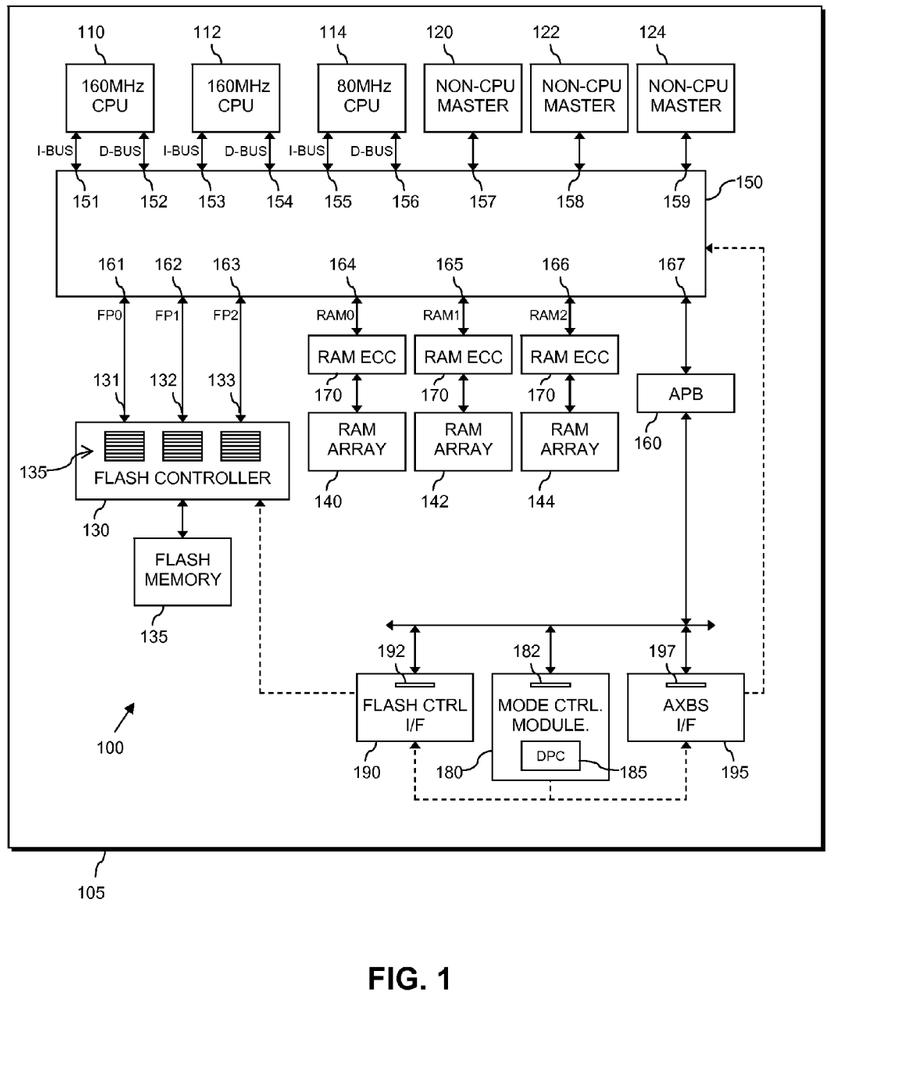
FIGS. 1 to 4 illustrate a simplified block diagram of an example of a signal processing device.

Referring first to FIG. 1, there is illustrated a simplified block diagram of an example of a multi-master/multi-slave microcontroller device 100, which in the illustrated example is implemented within an integrated circuit device 105. Specifically in the illustrated example, the microcontroller device 100 comprises a plurality of master devices including processing cores 110, 112, 114, and non-processor master devices 120, 122, 124. The non-processor master devices 120, 122, 124 may comprise, for example direct memory accesses (DMA) modules and the like. The microcontroller device 100 further comprises a plurality of slave devices including a flash controller 130 for providing access to flash memory 135, a plurality of RAM (random access memory) arrays 140, 142, 144.

A crossbar switch 150, for example such as an AHB (Advanced High-performance Bus) crossbar switch, is arranged to provide data paths between the various master and slave devices. The crossbar switch 150 is also arranged to provide data paths between the master devices and an AHB to peripherals bridge (APB) 160. The APB 160 provides an interface between the AHB interface and on-chip peripherals. Such on-chip peripherals typically comprise modules that contain readable/writable control and status registers. AHB master devices, such as one of the processing cores 110, 112, 114, are able to read and write to these registers through the APB 160.

The crossbar switch 150 comprises a plurality of master ports, which in the illustrated example comprise:
 a first master port 151 operably coupled to an instruction bus of a first processing core 110;
 a second master port 152 operably coupled to a data bus of the first processing core 110;
 a third master port 153 operably coupled to an instruction bus of a second processing core 112;

a fourth master port 154 operably coupled to a data bus of the second processing core 112;

a fifth master port 155 operably coupled to an instruction bus of a third processing core 114;

a sixth master port 156 operably coupled to a data bus of the third processing core 114;

a seventh master port 157 operably coupled to a first non-processor master device 120;

an eighth master port 158 operably coupled to a second non-processor master device 122; and a ninth master port 159 operably coupled to a third non-processor master device 124.

The crossbar switch 150 further comprises a plurality of slave ports, which in the illustrated example comprise:

a first slave port 161 operably coupled to a first port 131 of the flash controller 130;

a second slave port 162 operably coupled to a second port 132 of the flash controller 130;

a third slave port 163 operably coupled to a third port 133 of the flash controller 130;

a fourth slave port 164 operably coupled to a first RAM array 140;

a fifth slave port 165 operably coupled to a second RAM array 142;

a sixth slave port 166 operably coupled to a third RAM array 144; and a seventh slave port 167 operably coupled to the APB 160.

In the illustrated example, the flash controller 130 comprises a buffer for each port 131, 132, 133 thereof, illustrated generally at 135. Furthermore, the RAM arrays 140, 142, 144 are operably coupled to their respective slave ports 164, 165, 166 of the crossbar switch 150 via modules providing Error Correcting Codes (ECC) 170.

In the field of signal processing devices, such as microcontrollers, and in particular in relation to such devices targeted at low power applications, it is known for such devices to support multiple power modes. Within each power mode, different features of the device may be operational, for example some features may be clock-gated or power-gated depending on the particular power mode.

Figure 2:
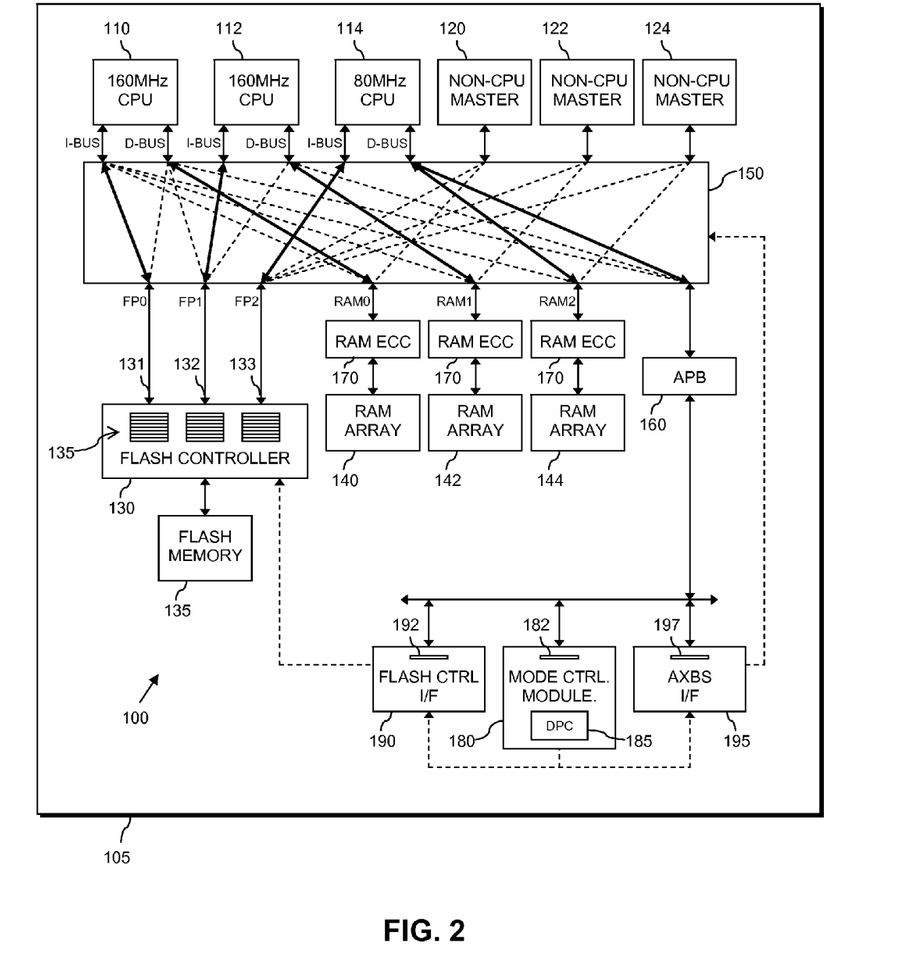

FIG. 2 illustrates an example of the microcontroller device 100 configured to operate in a fully operational mode. In this fully operation mode, all features and components of the microcontroller device 100 are powered and clocked. FIG. 2 further illustrates a simplified example of a default optimum data path configuration for this fully operational mode of the microcontroller device 100.

In this example of an optimum data path configuration, one port 131, 132, 133 of the flash controller 130 is dedicated to each of the processing cores 110, 112, 114. Accordingly, the crossbar switch 150 is configured to provide data paths between the first, third and fifth master ports 151, 153, 155 thereof and the first three slave ports 161, 162, 163 thereof respectively, as illustrated by the solid arrows there between in FIG. 2. For example, the crossbar switch 150 may be configured to 'park' the first three slave ports 161, 162, 163 thereof on the first, third and fifth master ports 151, 153, 155 thereof respectively, and to configure the first, third and fifth master ports 151, 153, 155 as highest priority master ports for the first three slave ports 161, 162, 163 thereof respectively.

Similarly, one RAM array 140, 142, 144 is dedicated to each of the processing cores 110, 112, 114. Accordingly, the crossbar switch 150 is configured to provide data paths between the second, fourth and sixth master ports 152, 154, 156 and the second three slave ports 164, 165, 166 respectively, as illustrated by the solid arrows there between. For example, the crossbar switch 150 may be configured to 'park' the second three slave ports 164, 165, 166 thereof on the second, fourth and sixth master ports 152, 154, 156 thereof respectively, and to configure the second, fourth and sixth master ports 152, 154, 156 as highest priority master ports for the second three slave ports 164, 165, 166 thereof respectively.

In this manner, optimum data paths through the crossbar switch 150, such as those represented by the solid arrows, may be configured between the processing cores 110, 112, 114 and the memory elements 135, 140, 142, 144. The broken lines between master ports and slave ports of the crossbar switch 150 represent alternative data paths that may be configured between master and slave devices. In the illustrated example the first and second processing cores 110, 112 comprise higher speed processing cores intended for high performance operation, whilst the third processing core 114 comprises a lower speed processing core intended for low power operation. Accordingly, the third slave port 163 of the crossbar switch may be shared between the third processing core 114 and the non-processor master devices 120, 122, 124. Conversely, the first and second slave ports 161, 162 of the crossbar switch 150 may be dedicated solely to the first and second processing cores 110, 112.

In addition to configuring optimum data path settings within the crossbar switch 150, it may also be beneficial to optimally configure data path settings within the flash controller 130. For example, for the default optimum data path configuration of the crossbar switch 150 illustrated in FIG. 2, pre-fetching strategies for the ports 131, 132, 133 of the flash controller 130 may be optimally configured according to the type of information to be fetched; e.g. based on whether instructions and/or data is/are to be fetched over the respective ports 131, 132, 133. Accordingly, in the example illustrated in FIG. 2, the first and second ports 131, 132 of the flash controller 130 may be configured for instruction pre-fetching, whilst the third port 133 of the flash controller 130 may be configured for instruction and data pre-fetching.

Figure 3:
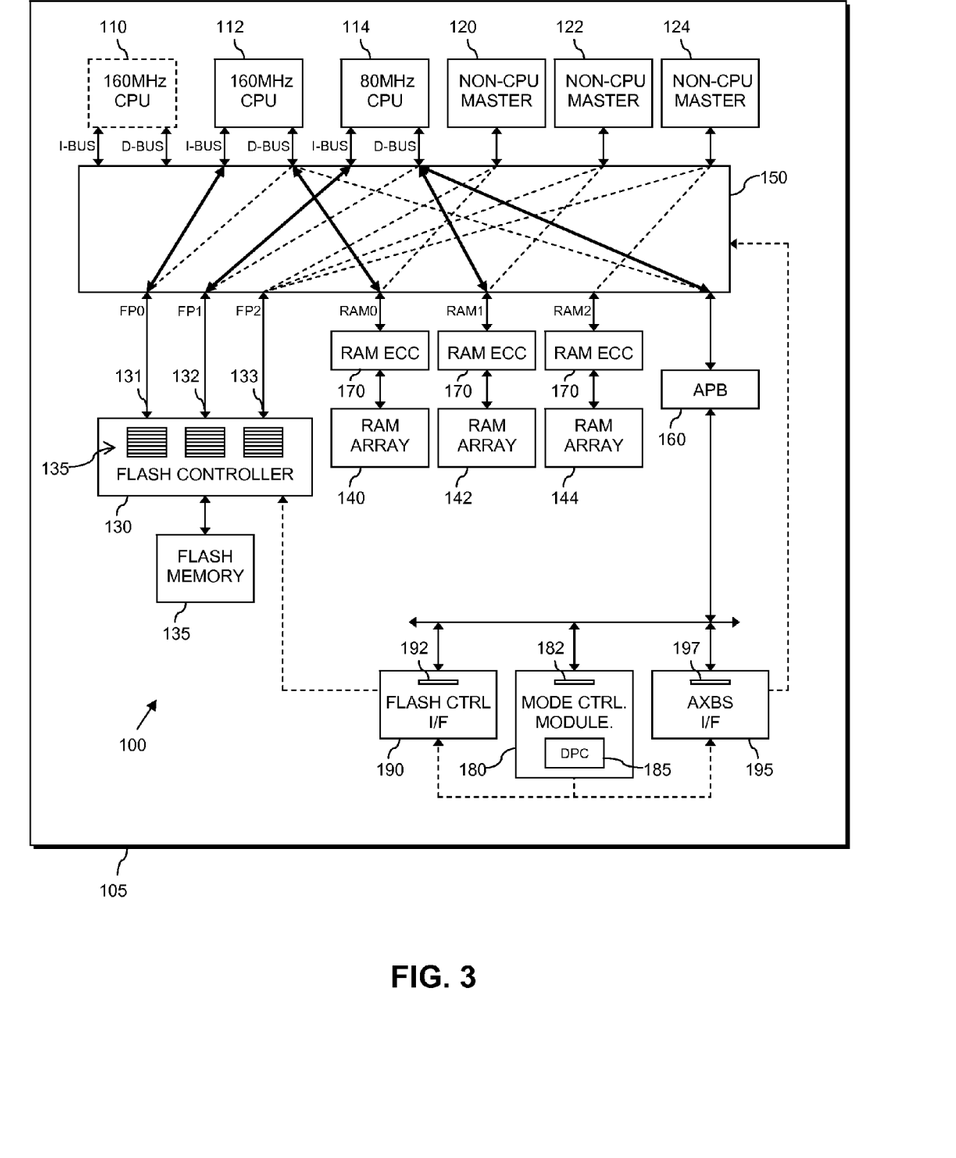

FIG. 3 illustrates an example of the microcontroller device 100 configured to operate in an alternative operational mode in which the first processing core 110 has been power/clock gated. FIG. 3 further illustrates a simplified example of a default optimum data path configuration for this alternative operational mode of the microcontroller device 100.

In this example of an optimum data path configuration for the alternative operational mode of the microcontroller device 100, the first and second ports 131, 132 of the flash controller 130 are dedicated to the second and third processing cores 112, 114 respectively. Accordingly, the crossbar switch 150 is configured to provide data paths between the third and fifth master ports 153, 155 thereof and the first and second slave ports 161, 162 thereof respectively, as illustrated by the solid arrows there between in FIG. 3. For example, the crossbar switch 150 may be configured to 'park' the first and second slave ports 161, 162 thereof on the third and fifth master ports 153, 155 thereof respectively, and to configure the third and fifth master ports 153, 155 as highest priority master ports for the first and second slave ports 161, 162 thereof respectively.

Similarly, the first and second RAM arrays 140, 142 are dedicated to each of the second and third processing cores 112, 114 respectively. Accordingly, the crossbar switch 150 is configured to provide data paths between the fourth and sixth master ports 154, 156 thereof and the fourth and fifth slave ports 164, 166 thereof. For example, the crossbar switch 150 may be configured to 'park' the fourth and fifth slave ports 164, 165 thereof on the fourth and sixth master ports 154, 156 thereof respectively, and to configure the fourth and fifth master ports 154, 156 as highest priority master ports for the fourth and fifth slave ports 164, 165 thereof respectively.

In this manner, optimum data paths through the crossbar switch 150, such as those represented by the solid arrows, may be configured between the operational processing cores 112, 114 and the memory elements 135, 140, 142, 144. Once again, the broken lines between master ports and slave ports of the crossbar switch 150 represent alternative data paths that may be configured between master and slave devices. For example, the third port 133 of the flash controller 130 may then be made available for the non-processor master devices 120, 122, 124. As such, the seventh, eighth and ninth master ports 157, 158, 159 may be configured as highest priority master ports for the third slave port 163.

In addition to configuring optimum data paths within the crossbar switch 150, optimum data path settings may also be configured within the flash controller 130. However, in the example illustrated in FIG. 3, optimum data path configurations for the ports 131, 132, 133 of the flash controller 130 may be substantially the same as for those of the example illustrated in FIG. 2. That is to say, in the example illustrated in FIG. 3, the first and second ports 131, 132 of the flash controller 130 may be configured for instruction pre-fetching, whilst the third port 133 of the flash controller 130 may be configured for instruction and data pre-fetching.

As can be seen in FIGS. 2 and 3, the optimum data path configuration of the crossbar switch 150 for the fully operational mode of the microcontroller device 100 illustrated in FIG. 2 would be sub-optimum for the alternative operational mode of the microcontroller device 100 illustrated in FIG. 3. Specifically, the data path configuration illustrated in FIG. 2 would result in the first port 131 of the flash controller 130 and the first RAM array 140 being unused if the microcontroller device 100 was in the alternative operational mode illustrated in FIG. 3, significantly limiting the performance capabilities of the microcontroller device 100 in this alternative operational mode.

Figure 4:
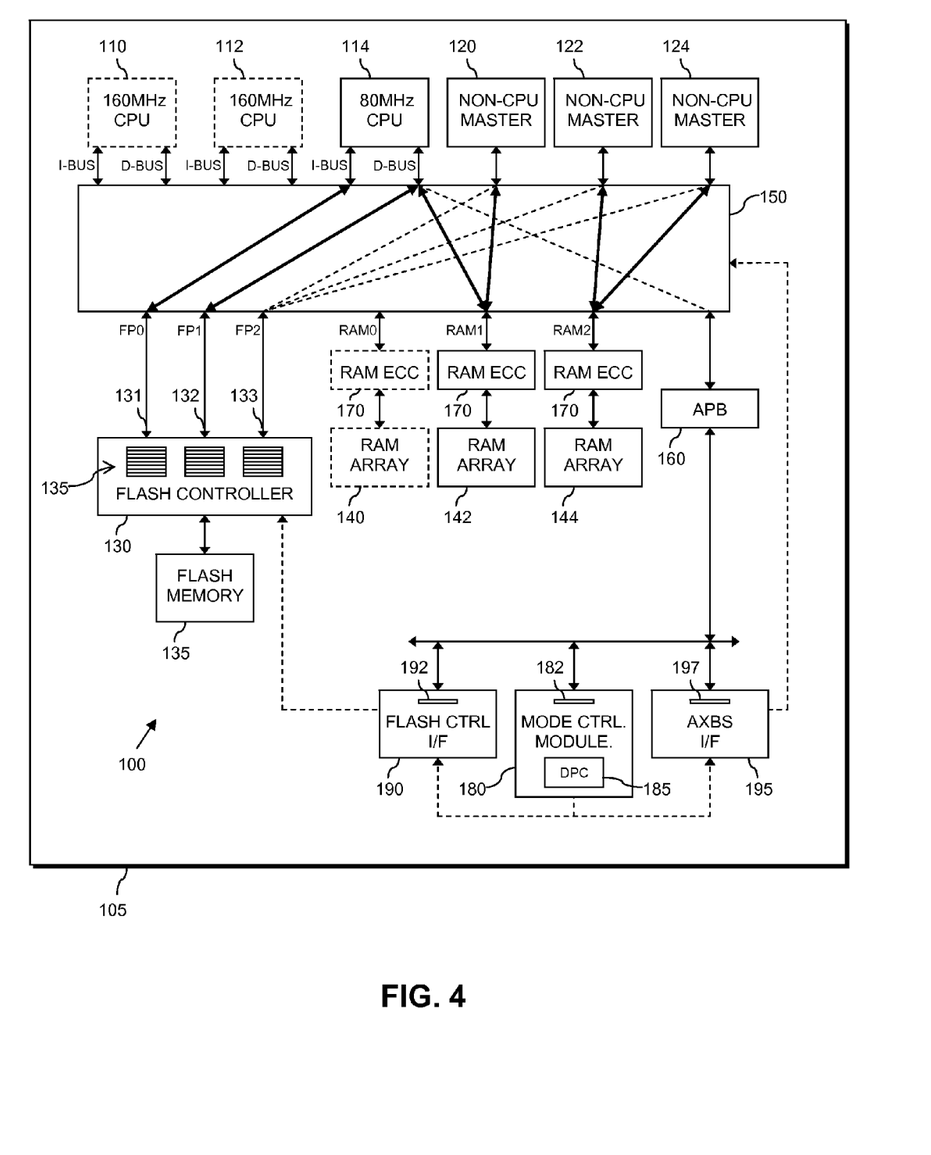

FIG. 4 illustrates an example of the microcontroller device 100 configured to operate in a further alternative operational mode in which the first and second processing cores 110, 112 have been power/clock gated, as has the first RAM array 140. FIG. 4 further illustrates a simplified example of a default optimum data path configuration for this further alternative operational mode of the microcontroller device 100.

In this example of an optimum data path configuration for the further alternative operational mode of the microcontroller device 100, the first and second ports 131, 132 of the flash controller 130 are dedicated to the third processing core 114. Accordingly, the crossbar switch 150 is configured to provide data paths between the fifth and sixth master ports 155, 156 thereof and the first and second slave ports 161, 162 thereof respectively, as illustrated by the solid arrows there between in FIG. 4. For example, the crossbar switch 150 may be configured to 'park' the first and second slave ports 161, 162 thereof on the fifth and sixth master ports 155, 156 thereof respectively, and to configure the fifth and sixth master ports 155, 156 thereof as highest priority master ports for the first and second slave ports 161, 162 thereof respectively.

In the example illustrated in FIG. 4, the second RAM array 142 is shared between the third processing core 114 and a first non-processor master device 120, whilst the third RAM array 144 is shared between the second and third non-processor master devices 122, 124, as illustrated by the solid arrows there between in FIG. 4.

In addition to configuring optimum data paths within the crossbar switch 150, optimum data path settings may be configured within the flash controller 130. For example, in the example illustrated in FIG. 4, the first port 131 of the flash controller 130 may be configured for instruction pre-fetching, the second port 132 of the flash controller 130 may be configured for data pre-fetching, and the third port 133 of the flash controller 130 may be configured for instruction and data pre-fetching.

Thus, as can be seen in FIG. 4, not only can optimum data path configurations for the crossbar switch 150 differ between different operational modes of the microcontroller device 100, but also optimum data path configurations for the flash controller 130. Conventionally, data path configurations for the different operational modes are configured by customers through software, based on the individual requirements etc. of their particular applications. For example, and as illustrated in FIGS. 1 to 4, software executing on any one of the processing cores 110, 112, 114 is able to configure an operational mode of the microcontroller device 100 by writing to a mode control register, for example such as register 182 within a mode control module 180, via the APB 160. The mode control module 180 may thus be arranged to configure an operation mode for the microcontroller device 100, for example by power/clock gating components within the microcontroller device 100 accordingly, based on one or more bit settings within the register 182. In addition, software executing on any one of the processing cores 110, 112, 114 is able to configure data path settings within the crossbar switch 150 and the flash controller 130 by writing to respective registers, for example such as registers 192 and 197 within flash controller interface module 190 and crossbar switch interface module 195 respectively. Thus, in this manner a customer is able to configure which operating modes the microcontroller device 100 uses, and also to configure the data path settings within the microcontroller device 100.

However, due to difficulty for customers to gain an in-depth understanding of the underlying system and the complexities involved in re-configuring such elements within a typical microcontroller device, data path settings are often configured in a non-optimized manner for one or more power modes when left to a customer to configure in this conventional manner.

Referring back to FIG. 1, in the illustrated example the microcontroller device 100 further comprises a data path configuration component 185 for configuring at least one data path setting within the microcontroller device 100, which in the illustrated example forms a part of the mode control module 180. The data path configuration component 185 is arranged to receive an indication of an operating mode of the microcontroller device 100, for example from the mode control register 182 in the illustrated example, and to dynamically configure at least one data path setting within the microcontroller device 100 based at least partially on the received indication of an operating mode thereof. For example, the data path configuration component 185 may be arranged to dynamically configure at least one data path setting for configuring data paths between at least one processor core 110, 112, 114 of the microcontroller device 100 and at least one memory element, such as the flash memory 135 and/or one or more of the RAM arrays 140, 142, 144 in the illustrated example.

For example, the data path configuration component 185 may be arranged to dynamically configure at least one data path setting within the crossbar switch 150, for example by way of writing to the register 197 within the crossbar switch interface module 195 in accordance with the operational mode of the microcontroller device 100. For example, the data path configuration component 185 may be arranged to dynamically configure a highest priority master port priorities for one or more slave ports of the crossbar switch 150, and/or to park one or more slave ports on one or more master ports of the crossbar switch 150.

Additionally and/or alternatively, the data path configuration component 185 may be arranged to dynamically configure at least one data path setting within the flash controller 130, for example by way of writing to the register 192 within the flash controller interface module 190 in accordance with the operational mode of the microcontroller device 100. For example, the data path configuration component 185 may be arranged to dynamically configure one or more pre-fetching strategies for one or more of the ports 131, 132, 133 of the flash controller 130. For example, the data path configuration component 185 may configure one or more of the ports 131, 132, 133 of the flash controller 130 for instruction pre-fetching, for data pre-fetching and/or for instruction and data pre-fetching.

Thus, an example of a hardware solution to the problem of configuring optimum data paths for different operational modes of a microcontroller device has been illustrated and described that enables efficient dynamic configuration of optimum data path settings for different operational modes of the microcontroller device, without the need for customers to perform inter-operational mode configuration themselves via software. Advantageously, such configuration may be predefined by, for example, the system designers who have a detailed knowledge and understanding of the underlying system and the complexities involved in re-configuring such elements within the microcontroller device. For example, the data path configuration settings for each operational mode may be hardwired within the data path configuration component 130 during the design stage of the microcontroller device 100. Alternatively, the data path configuration settings for each operational mode may be pre-programmed within non-volatile memory. Such settings may thus be loaded into an area of memory accessible by the data path configuration component 185 (not shown).

Whilst the present invention has been described in relation to the dynamic configuration of data path configuration settings within the crossbar switch 150 and the flash controller 130 in the illustrated example, it will be appreciated that the present invention is not limited to only the dynamic configuration of such data path settings, and may equally be applied to additional/alternative data path configuration settings within a signal processing device. For example, such alternative settings or applications may include, by way of example only, application to other systems, such as architectures with more than three central processing units and/or more than three random access memory elements (RAMs), etc. In other examples, there may be, in effect, no limit to the number of combinations of master devices, slave devices, buffers, and available crossbar ports. In some examples, the greater number of each devices, the more complicated the systems/architecture and, thus, the greater the requirement for a form of auto-configuration, as described herein, In accordance with one example of the invention, a method of configuring at least one data path setting within a signal processing device is described. The method comprises, within a data path configuration component of the signal processing device, receiving an indication of an operating mode of the signal processing device; and dynamically configuring the at least one data path setting within the signal processing device based at least partially on the received indication of an operating mode of the signal processing device.

Figure 5:
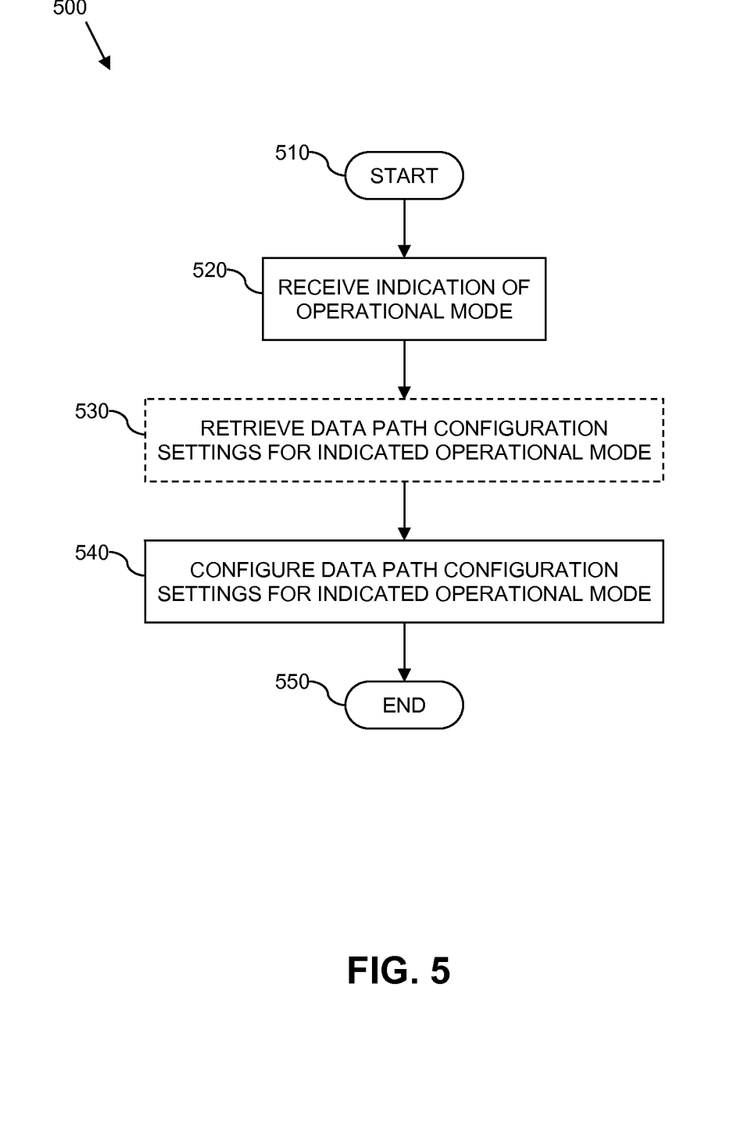
FIG. 5 illustrates a simplified flowchart of an example of a method of configuring at least one data path setting within a signal processing device.

In particular, and referring now to FIG. 5, there is illustrated a simplified flowchart 500 of an example of a method of configuring at least one data path setting within a signal processing device, for example such as may be implemented within the data path configuration component 185 of FIGS. 1 to 4. The method starts at 510, and moves on to 520 with the receipt of an indication of an operational mode for the signal processing device. For example, such a receipt of an indication of an operational mode may comprise reading a value within an operating mode register, such as the mode control register 182 illustrated in FIGS. 1 to 4. Next, at 530 in the illustrated example, data path configuration settings for the indicated operational mode are retrieved, for example from an area of memory. It will be appreciated that the retrieval of such data path configuration settings may be omitted if, for example, such data path configuration settings for the different operational modes are hardwired within a data path configuration component. The data path configuration settings are then configured, at 540, for example within one or more crossbar switches and/or one or more memory controllers. The method then ends, at 550.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated example the data path configuration component 185 has been illustrated and described as comprising an integral part of a mode control module 180 of the microcontroller device 100. However, it will be appreciated that the data path configuration component 185 may equally be implemented as a standalone component within the microcontroller device 100, or may be implemented as an integral part of some other part of the microcontroller device 100. Alternatively, it is contemplated that the data path configuration component 185 may be implemented as software executed by, for example, one or more of the processing cores 110, 112, 114 of the microcontroller device 100.

Any arrangement of components to achieve the same functionality is effectively 'associated', such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Furthermore, it will be appreciated that simplified examples of an implementation of the present invention have been illustrated and described herein. For example, modern microcontroller devices, etc. typically comprise hierarchies of crossbar switches, for example up to three crossbars deep.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A microprocessor comprising:
a crossbar switch coupling a set of master ports to a set of slave ports according to a first data path configuration setting, the first data path configuration parking a first slave port on a first master port to provide a first data path setting between the first slave port and the first master port; and
a data path configuration component for configuring at least one data path setting within the crossbar switch, the data path configuration component configured to receive an indication of an operating mode of the microprocessor and, in response to the received indication of the operating mode of the microprocessor, dynamically connecting the set of master ports to the set of slave ports according to a second data path configuration setting wherein the first slave port is parked on a second master port distinct from the first master port to provide a second data path setting for the first slave port distinct from the first data path setting.

2. The microprocessor of claim 1, wherein the data path configuration component is configured to dynamically configure a data path setting for a data path between at least one processor core of the microprocessor and at least one memory element.

3. The microprocessor of claim 2, wherein the data path configuration component is configured to dynamically configure at least one data path setting within the crossbar switch.

4. The microprocessor of claim 3 wherein the data path configuration component is configured to dynamically configure
at least one master port priority for at least one slave port.

5. The microprocessor of claim 2, wherein the data path configuration component is configured to dynamically configure at least one data path setting within at least one memory controller module within the microprocessor.

6. The microprocessor of claim 5, wherein the data path configuration component is configured to dynamically configure at least one from a group comprising:
at least one memory port for instruction pre-fetching;
at least one memory port for data pre-fetching; and
at least one memory port for instruction and data pre-fetching.

7. The microprocessor of claim 6, wherein at least one of the instruction and data pre-fetching is/are configured based on a low power mode of the microprocessor.

8. The microprocessor of claim 1, wherein the data path configuration component is configured to read a mode control value stored within a mode control register of the microprocessor, and to dynamically configure the at least one data path setting within the microprocessor based at least partially on the read mode control value.

9. The microprocessor of claim 1, wherein master ports corresponding to a first processing core are free of parking on by slave ports according to the second data path configuration setting.

10. The microprocessor of claim 9, wherein the second master port corresponds to a second processing core distinct from the first processing core.

11. The microprocessor of claim 1, wherein the microprocessor is implemented within an integrated circuit device comprising at least one die within a single integrated circuit package.

12. A method of configuring at least one data path setting within a microprocessor comprising a crossbar switch coupling a set of master ports to a set of slave ports, the method comprising, within a data path configuration component of the microprocessor:
receiving an indication of an operating mode of the microprocessor; and
dynamically configuring the at least one data path setting within the crossbar switch based on the received indication of an operating mode of the microcontroller according to a data path configuration setting to uncouple a connection between a master port and a slave port.

13. The method of claim 12 wherein said dynamically configuring the at least one data path setting further comprises:
configuring at least one data path between at least one processor core of the signal processing device and at least one memory element.

14. The method of claim 13 further comprising dynamically configuring the at least one data path setting within the crossbar switch.

15. The method of claim 12 further comprising:
storing a mode control value in a mode control register of the microprocessor;
reading the mode control value; and
dynamically configuring the at least one data path setting based on the read mode control value.

16. The method of claim 12, wherein the microprocessor further comprises the set of master ports and the set of slave ports, the set of master ports corresponding to master devices within the microprocessor and the set of slave ports corresponding to slave devices within the microprocessor.

17. The microprocessor of claim 1, further comprising:
a set of master devices, the set of master devices including a first processing core;
the set of master ports, wherein the set of master ports correspond to the master devices and the first master port corresponds to the first processing core; and
the set of slave ports, wherein the set of slave ports correspond to slave devices within the microprocessor, the first slave port providing access to a first memory device located within the microprocessor.

* * * * *